United States Patent [19]

Templeton, III

[11] 4,175,445

[45] Nov. 27, 1979

[54] PRESSURE SENSING APPARATUS

[75] Inventor: John S. Templeton, III, Houston, Tex.

[73] Assignee: Exxon Production Research Company, Houston, Tex.

[21] Appl. No.: 939,580

[22] Filed: Sep. 5, 1978

[51] Int. Cl.$^2$ ............................................. G01L 11/00
[52] U.S. Cl. .................................. 73/768; 73/141 A; 73/726
[58] Field of Search ............... 73/141 A, 784, 84, 723, 73/724, 725, 726, 727, 728, 768

[56] References Cited

U.S. PATENT DOCUMENTS

| | | | |
|---|---|---|---|
| 2,995,034 | 8/1961 | Boiten | 73/141 |
| 3,216,245 | 11/1965 | Seed | 73/141 |
| 3,372,577 | 3/1968 | Bates et al. | 73/726 X |
| 3,548,650 | 12/1970 | Boadle | 73/141 |
| 3,565,195 | 2/1971 | Miller et al. | 177/210 |
| 3,678,378 | 7/1972 | Trott et al. | 324/61 R |
| 3,782,486 | 1/1974 | Kuhn et al. | 73/141 X |
| 3,875,481 | 4/1975 | Miller et al. | 73/141 X |
| 3,995,696 | 12/1976 | Kalmer et al. | 73/141 A X |

OTHER PUBLICATIONS

Metge, M. et al., On Recording Stresses in Ice, Proceedings of the Third International Symposium on Ice Problems, Aug. 1975, pp. 459-468, Hanover, N.H.
Nelson, R. D. et al., Techniques for Measuring Stress in Sea Ice, University of Alaska, Sea Grant No. 77-1, Jan. 1977.
Brown, S. F., The Performance of Earth Pressure Cells for Use in Road Research, from Civil Engineering and Public Works Review, pp. 160-165, Feb. 1971.
Peattie, K. R., The Fundamental Action of Earth Pressure Cells, from Journal of the Mechanics and Physics of Solids, 1954, vol. 2, pp. 141-155.

Primary Examiner—Jerry W. Myracle
Attorney, Agent, or Firm—Marc L. Delflache

[57] ABSTRACT

A pressure sensing apparatus for measuring ice pressure forces while embedded in an ice pack is disclosed. The pressure sensing apparatus is thin in comparison to its width and length, having a stiffness similar to the average anticipated stiffness of the embedding material. The apparatus includes a housing having a first and second substantially flat plate connected at their outer edges and sensitive to external ice pressure forces. A thin member is supported within the housing between the first and second plate by a plurality of standoffs or ribs which subjected the member to reverse curvature bending upon the application of external pressures to the first and second plates. Wire resistance strain gauges are attached to the thin member to measure the strain of the member when subjected to the bending. In this manner, the pressure against the sensor can be correlated with the strain measurements resulting on the member.

15 Claims, 17 Drawing Figures

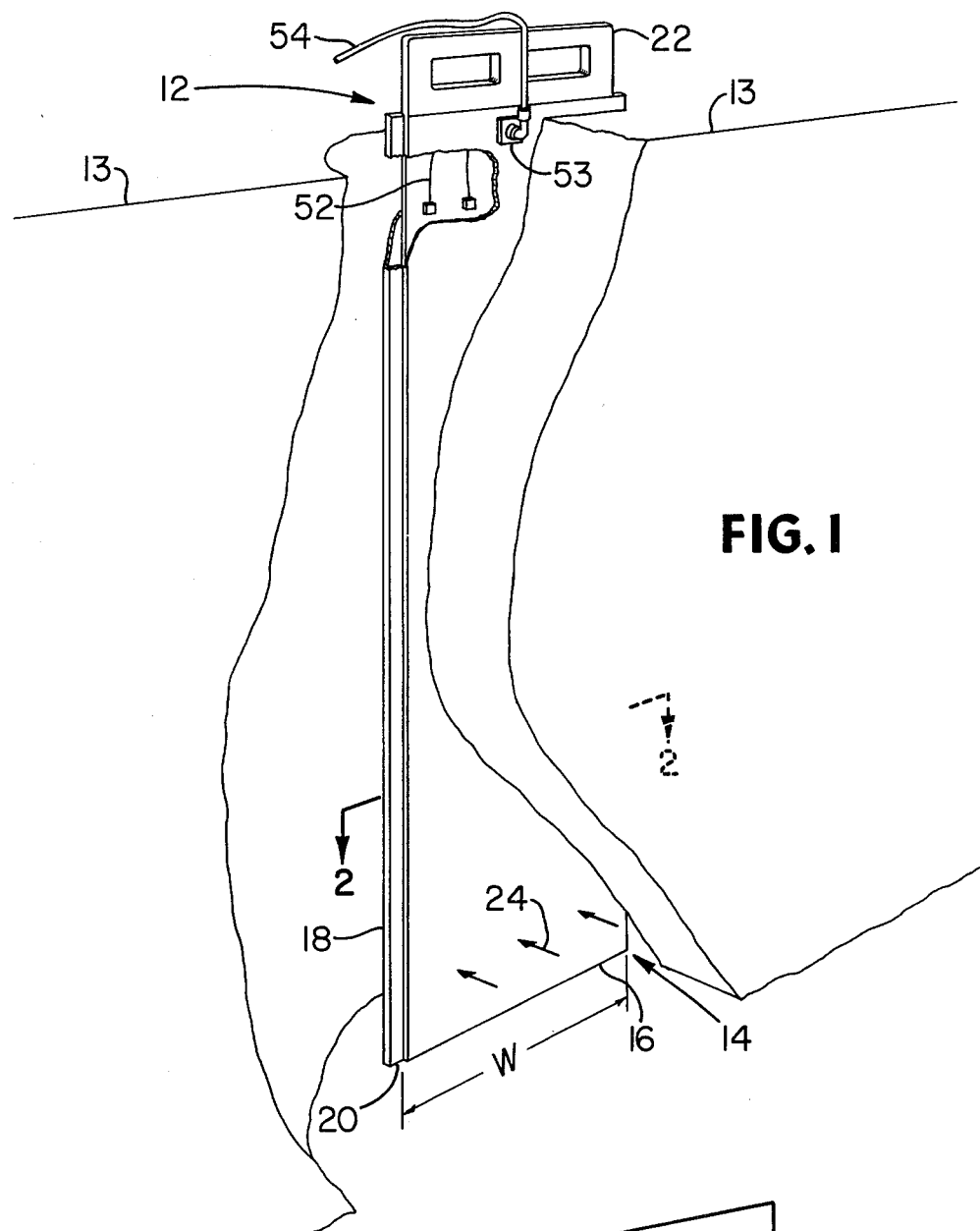
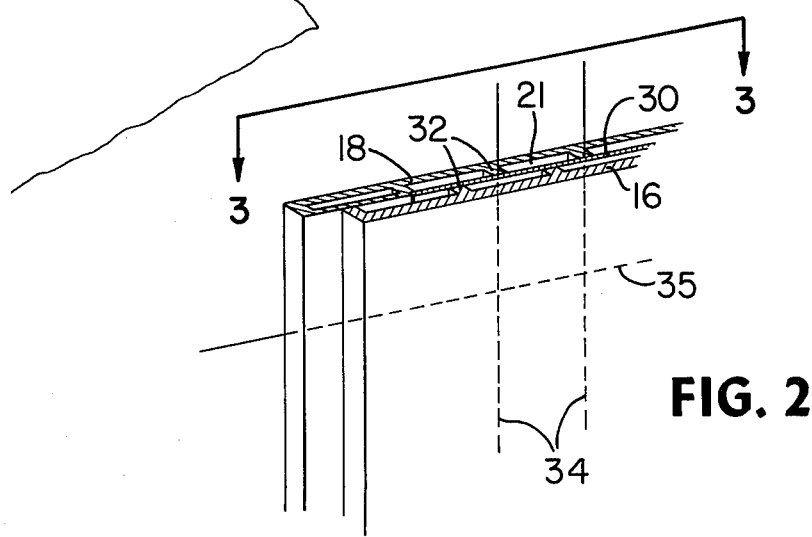
FIG. 1
FIG. 2

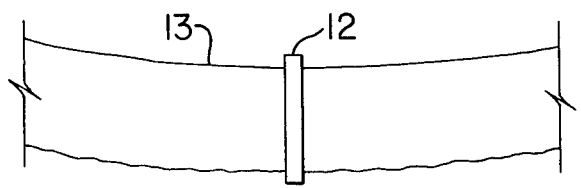
FIG. 7
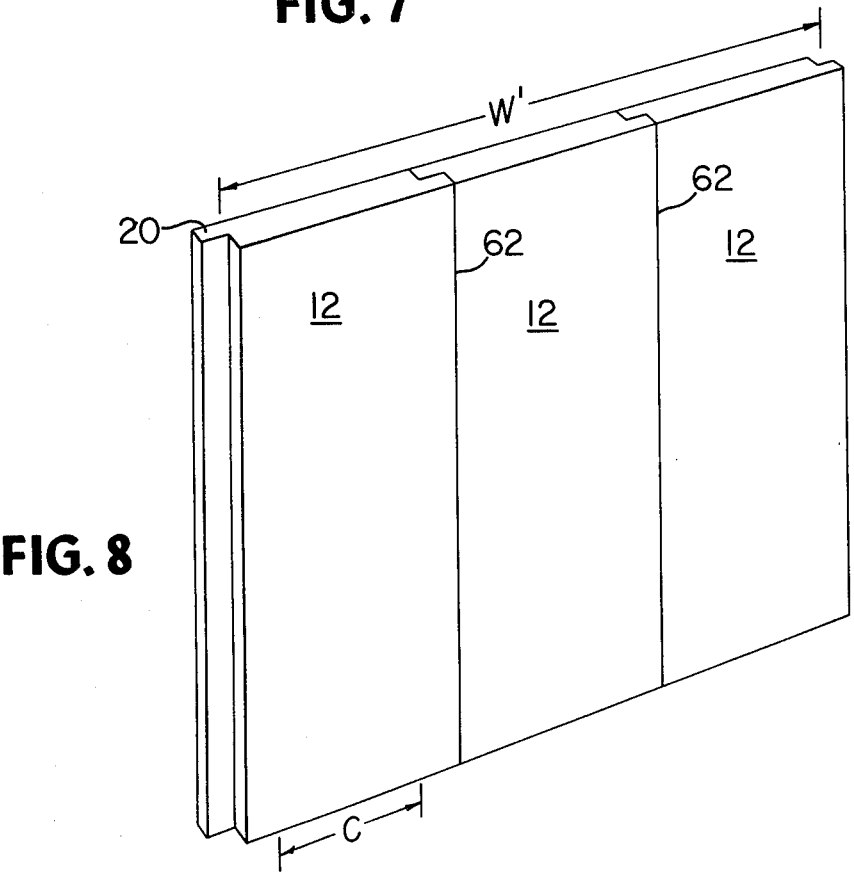
FIG. 8
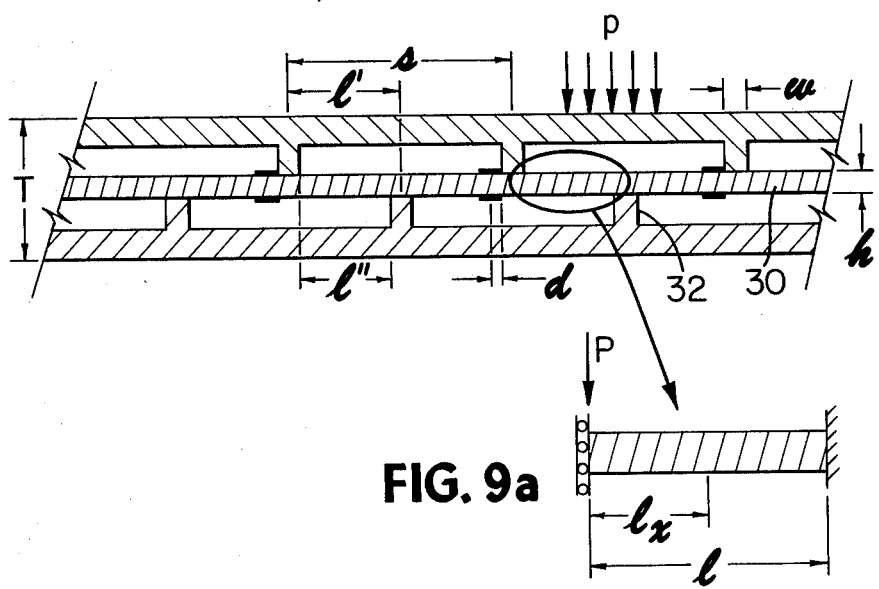
FIG. 9
FIG. 9a

PRESSURE SENSING APPARATUS

BACKGROUND OF THE INVENTION

1. Field of the Invention

The present invention relates to a pressure sensing apparatus and, more particularly, to a pressure sensing apparatus for measuring ice pressure forces which is relatively insensitive to the stiffness or elasticity of the ice formation.

2. Description of the Prior Art

Loads are traditionally measured by point application load cells. A point load is transposed onto a rigid member of a cell which in turn measures the total applied force. Unfortunately, pressure (force per unit area) is more difficult to measure particularly on a large scale, i.e. geotechnical pressures, since it requires a fairly large sampling area to accurately detect an average pressure. Frequently, such pressures are measured by resolving or summing the pressure over a defined area into a single point load and, thereafter, employing a conventional load cell. However, the accuracy of this method depends entirely on the particular method used to resolve the pressure forces. Traditionally, the pressure is resolved into a concentrated load by permitting the pressure to act against a large plate. The total force against the plate is then measured using a rigid arm from a load cell. Unfortunately, the structural characteristics or properties of the plate play a vital role in determining the accuracy of the results. In other words, the bending properties of the plate may unduly interfere with the accuracy of the results since the pressure force will not be uniformly distributed over the entire plate.

The measurement of pressure forces within an embedding medium is particularly important in determining geotechnical pressures as well as developing design criteria. More particularly, the measurement of ice pressure forces is important in determining environmental design criteria for Arctic offshore and coastal structures. Generally, the failure strength of ice, in situ, the stress history of a typical ice park, and the modes of interaction between the structure and the ice pack are the minimum amount of data required to begin the design of an arctic offshore or coastal structure. It is particularly important to gather the essential design data in situ. Samples removed from the embedding medium for subsequent laboratory testing are of limited value since the environmental restraints once removed are difficult if not impossible to accurately recreate in a laboratory. This is particularly true for ice samples which are extremely vulnerable to outside interference once removed. In addition, measuring pressures in situ is particularly valuable since it reflects what the embedding medium is actually experiencing in terms of pressure forces. Therefore, the need exists for a reliable pressure sensing apparatus which can gather the design data from the ice formations in place.

Industry has recognized several factors peculiar to ice pressure measurement which render the prior art inoperable. Due to the crystalline structure of ice, the sensing area of the apparatus must be large with respect to the grain dimensions in order to accurately measure a pressure force. Grain sizes have been measured several inches in size. Therefore, a fairly large area is required to generate an average pressure. In addition, the effective stiffness of the pressure sensor should not cause the localized brittle fracture or plastic deformation of the ice adjacent the sensing plates. In other words, the effective stiffness of the sensor should be as close to the average anticipated stiffness or elasticity of the ice as possible. Due to large temperature fluctuations in the polar regions, differential thermal movement between the sensor and the ice occurs. This creates an artificial pressure which can and should be minimized by design.

The modulus of elasticity of ice is not constant. It varies from 40,000 to 1,000,000 psi depending on the temperature, salinity, grain structure, etc. Therefore, while the effective stiffness of the sensor should be close to the average anticipated stiffness of the ice to prevent localized stiffness problems, the sensor should be relatively insensitive to sudden variations in ice stiffness. The sensor must also be insensitive to the occurrence of ice creep which can affect the accuracy of an embedded ice sensor. In addition, the sensor must include measuring components such as electrical wire resistance strain gauges which are located within a circuit to compensate for direct thermal effects. The sensor must also be water proof to prohibit the formation of ice within the sensor which otherwise would interfere with the functioning of the sensor's internal components. The sensor must also be able to withstand the high pressure forces, i.e. 200–500 psi, exerted by the ice formation.

The use of a thin sensor with respect to its width is preferred. "On Recording Stresses In Ice" by Metge, M., Strilchuk, A., and Trofimenkoff, P., *Proceedings of the Third International Symposium on Ice Problems*, Aug. 18–21, 1975, Hanover, N.H., discloses the use of a wide, thin and soft sensor to satisfy the above-recognized problems associated with ice pressure measurements. Metge recommends the use of a sensor whose stiffness is substantially less than the stiffness of ice. Metge discloses a sensor having an aluminum plate sandwiched between two layers of an elastomeric material which is in turn sandwiched between two outer aluminum plates. The amount of deformation in the sensor is determined by measuring the change in capacitance between the inner and outer aluminum plates. A correlation is made between the change in capacitance and the applied pressure. Metge fails to disclose a temperature compensating feature with the use of capacitors. Furthermore, Metge fails to disclose the use of a flexible member displaced between two aluminum plates by a series of standoffs or ribs having a plurality of strain gauges attached to the member between the standoffs for measuring strain in the member resulting from the reverse curvature bending of the member.

SUMMARY OF THE INVENTION

The present invention satisfies all the problems recognized by industry in attempting to measure ice pressure forces in an Arctic environment.

The pressure sensing apparatus comprises an exterior housing having a first and second substantially flat plate connected at their peripheral edges and mutually parallel. The thickness of the housing is substantially less than its width. The apparatus includes support means having a plurality of elongated standoffs or ribs contacting the interior surface of each plate such that the longitudinal axis of each standoff is normal to the direction of applied external pressure. A thin and flexible member is spaced from the interior surface of each plate a predetermined distance by the standoffs. The standoffs on one side of the member are staggered with respect to the standoffs on the other side of the member to permit reverse curvature bending of the member when external pressure forces are applied to the outer plates. The geometry of the apparatus is sized such that the stiffness of the composite apparatus is substantially similar to the average anticipated stiffness of the embedding medium. Yet, the ratio of outside dimensions is chosen such that the apparatus is relatively insensitive to variations in the stiffness of the embedding medium along the thickness of the plate.

Due to the reverse curvature bending of the member, a plurality of tension and compression zones are defined along both surfaces of the member's width. The apparatus includes a means for measuring the deformation of the member. In a modification of the invention, the measuring means comprises a plurality of strain gauges attached to the member in pairs between standoffs within the tension and compression zones to measure the deformation or strain in the member during application of the external pressure. In this manner, a change in the electrical resistance of the strain gauges can be correlated to an external pressure force.

In another modification of the invention, the pressure sensor includes a means for combining a plurality of sensors in series to provide a larger pressure sensing area. The combining means comprises a lip protrusion formed by the relatively staggered placement of the first plate with respect to the second plate. In this manner, the stiffness of the connection between two sensors is substantially similar to the stiffness of a sensor at its center section. This permits an accurate reading across the entire width of several sensors without having to discount the results normally attributable to a stiffer section at the connection of two sensors. The connection between the first and second plate is water-tight to prevent moisture damage or icing interference with the sensor's internal components.

It is a general object of the present invention to provide a pressure sensing apparatus capable of accurately measuring external pressure forces with minimal interference from differential thermal movement, localized stress, creep and variation in the stiffness of the embedding medium or material.

BRIEF DESCRIPTION OF THE DRAWINGS

In order that the features of this invention may be better understood, a detailed description of the invention as illustrated in the attached drawings follows:

FIG. 1 is a perspective view of the present invention embedded in a pressure exerting medium such as ice. A section is cut through the layer of ice in the foreground and a quarter section of the pressure sensor is also removed.

FIG. 2 is a perspective cross-section view of the present invention taken along line 2—2 of FIG. 1.

FIG. 7 is a side view illustrating the present invention embedded in an ice formation wherein the ice formation is experiencing a positive bending moment.

FIG. 8 is an isometric view of several pressure sensing apparatuses combined to increase the pressure sensing area.

FIG. 9 is a detail of the cross-section shown in FIG. 3 indicating the location of the various dimensions discussed with respect to the Example.

FIG. 9a is a free-body diagram of a beam element taken from FIG. 9.

DETAILED DESCRIPTION

Figure 3:
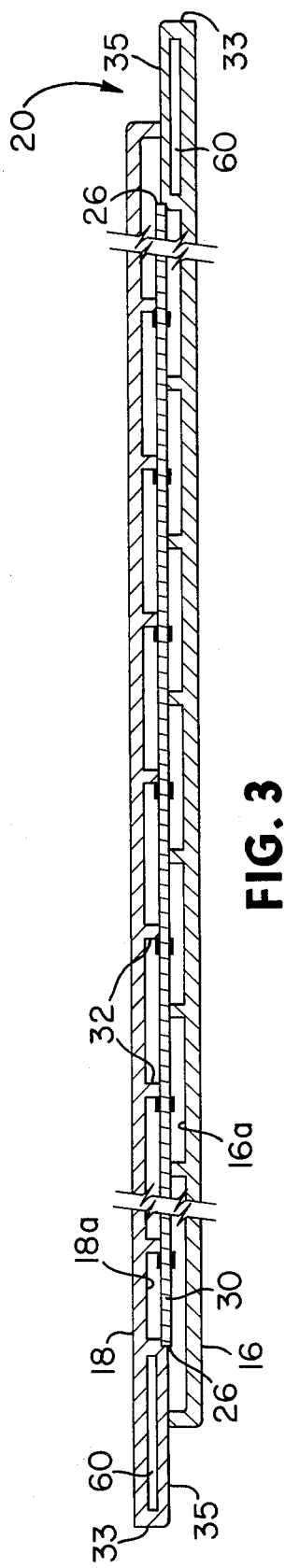
FIG. 3 is a plan view of the cross-sectional view shown in FIG. 2.

Referring now to the drawings and with particular reference first to FIG. 1, a pressure sensing apparatus 12 is shown embedded in an ice formation 13. The sensor, however, is not restricted to pressure measurements within an ice formation. The sensor may be placed in any type of embedding medium such as soil or concrete. Alternatively, the sensor may be used effectively in non-embedding mediums. For example, the sensor can be used to detect large forces from the wheels of a moving object, such as an automobile, train, airplane or the like, rolling over it. However, for purposes of this disclosure the sensor will be discussed in terms of sensing ice pressure forces in a polar environment. The application of the present invention to the alternate uses noted above will be apparent in light of the following discussion.

Referring still to FIG. 1, the sensor 12 includes a housing 14 having first and second plates 16, 18 which are attached to each other in an air-tight manner around their peripheral edges. The plates 16, 18 are flat and oriented substantially parallel to one another. The plates 16, 18, are normally the same size; however, they are not sealed at their mutual edges but rather are staggered slightly forming a lip protrusion 20. The lip protrusion 20 permits the combination of several sensors adjacent one another such that the stiffness at the connection is substantially similar to the stiffness at the center of the sensor. Thus, a larger pressure sensing area is available without introducing irregularities in the stiffness across the width of the sensor. In addition, the plates 16, 18 are slightly thicker at their outer edges which form the lip protrusion 20 providing a space 21 (see FIG. 2) between the plates 16, 18 when attached. A handle 22 is connected to the top end of the sensor 12 to facilitate the installation and removal of the apparatus.

Turning to FIG. 2, a thin, flexible member 30 is supported in spaced relationship within the space 21 between the first and second plates 16, 18. The member 30 is shown to be rectangular in shape; however, any shape is satisfactory. The sensor 12 includes a plurality of elongated standoffs or ribs 32 each having a longitudinal axis 34. The member 30 is supported by the standoffs 32. The longitudinal axis 34 of each sensor is oriented normal to the direction of ice pressure forces 24 (FIG. 1). The standoffs 32 on one side of the member 30 are staggered with respect to the standoffs on the other side of the member 30. This allows the member 30 to bend in a reverse curvature manner when pressure forces 24 are applied to the first and second plates 16, 18. The member 30 exhibits characteristics of classical beam analysis when individual cross-sectional elements of the member 30 are analyzed along the width, W, of the sensor. The specifics of the analysis are discussed below in the Example.

Figure 3A:
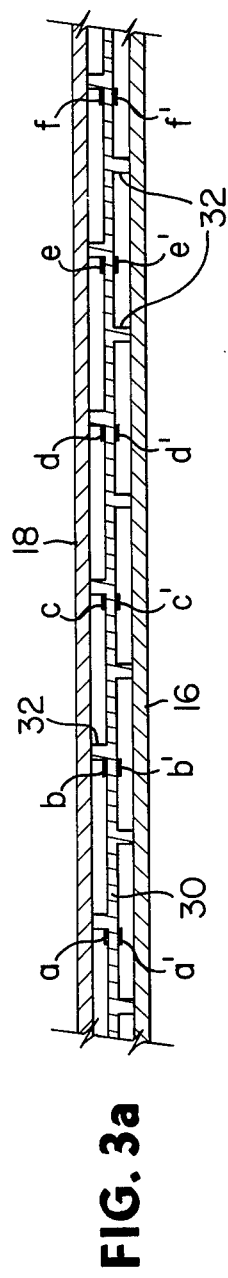
FIG. 3a is a detail of FIG. 3, slightly modified, however, showing a series of standoffs mounted to a thin interior member rather than an outer plate.
Figure 4:
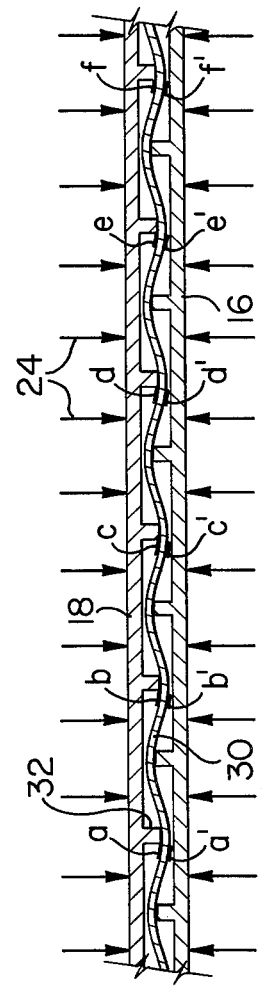
FIG. 4 is a detailed view of the present invention as illustrated in FIG. 3, however, in a compressed state wherein the member is subjected to reverse curvature bending due to compressive forces transferred to the member through the standoffs.

FIG. 3 illustrates the standoffs 32 mounted to the first and second plates 16, 18 contacting the member 30. FIG. 3 is a plan view of the cross-sectional view of FIG. 2. The standoffs 32 support the member 30 a predetermined distance from the interior surface 16a, 18a of the first and second plates 16, 18. The standoffs 32 will serve their purpose equally well if mounted to the member 30 contacting the first and second plates 16, 18 as shown in FIG. 3a. As noted above, the member 30 is not limited to a rectangular configuration. Any shape for member 30 would suffice provided classical beam analysis on individual cross-sectional elements of the member 30 taken along its width is possible. The standoffs 32 need not be mutually parallel along axis 34 so long as beam analysis for a strip or cross-sectional element is possible. The standoff must, however, be normal to the direction of applied pressure force to measure the maximum pressure. It is preferable as shown in FIGS. 2–4 to orient the standoffs parallel to one another in order to simplify the construction of the apparatus and minimize the degree of analysis required to properly correlate the deformation of the member 30 with the respective external pressure force. The standoffs may also be oriented parallel to an axis 35 (FIG. 2) running the width of the sensor since beam analysis on individual elements running the length of the sensor is also possible. For discussion purposes hereafter, however, the subject invention will be described in terms of the standoffs being mutually parallel along axis 34.

The plates 16, 18, which are slightly thicker at their edges 33, include a slot 60 forming a top plate 35 of approximately the same thickness as the member 30. In this manner, the member 30 can be fixed to the plate 35 and thereby provide continuity of the sensing member throughout the edge 33. The width of the slot 60 is similar to the width between standoffs. Thus, the particular geometry at the edge of the sensor is chosen to keep the stiffness constant and minimize variations in the sensor's stiffness.

Referring to FIG. 3a, a plurality of strain gauges a–f, a'–4' are attached, in pairs, one of each pair on each side of the member 30 to measure strain resulting from the applications of external pressure forces. The gauges are attached opposite one another to accommodate direct temperature interference. When temperature effects cause physical changes in the size of the member 30 and the resistance of the strain gauges a–f, a'–f', an average reading between opposing gauges will eliminate the inaccuracy due to direct thermal interference. The practice of using strain gauges in pairs to accommodate temperature interference is well known in the field of strain gauge technology.

As shown in FIG. 4, various tension and compression zones are defined along the member 30 due to the reverse curvature bending resulting from the application of external pressures 24 on the first and second plates. Strain gauges a–f are each mounted in a compression zone immediately adjacent a standoff 32. Each gauge a–f has an opposing strain gauge a'–f' mounted directly opposite the former in a tension zone.

Figure 5A:
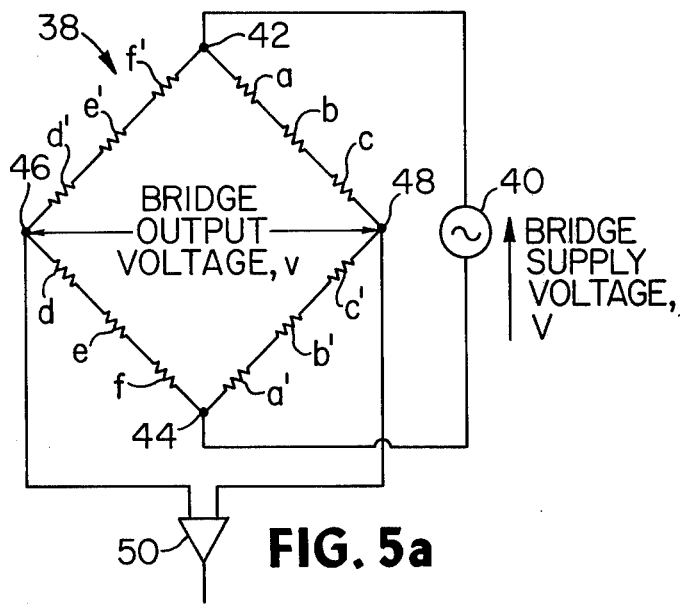
FIGS. 5a–c are variations of an electrical circuit used to measure changes in electrical resistance of a series of strain gauges mounted on the thin member for determining external pressure forces.

A typical circuit commonly used in the art for registering imbalance between pairs of strain gauges is a wheatstone network 38 as illustrated in FIG. 5a. The voltage source 40 is input into the network 38 at terminals 42, 44 while the output voltage is monitored at terminals 46, 48 and fed into an amplifier 50 whose output is measured. A balanced wheatstone bridge will not detect an imbalance across the output terminals 46, 48 until a change in resistance within one of the legs of the bridge occurs. Due to the orientation of the strain gauges on the member 30, an imbalance in the bridge will not occur until the member is placed in reverse curvature bending resulting from a compressive pressure force as shown in FIG. 4.

The specific manner in which the strain gauges are used in providing the pressure measurement can be seen by reference to the equation (1) for the Wheatstone bridge shown in FIG. 5a. If the bridge is initially balanced (v = o) and all of the strain gauges resistances are approximately equal to a single nominal value, R, then the bridge imbalance voltage is given by the following general equation:

$$v = (\Delta R_{a'} + \Delta R_{b'} + \Delta R_{c'} + \Delta R_{d'} + \Delta R_{e'} + \Delta R_{f'} \quad (1)$$
$$- \Delta R_a - \Delta R_b - \Delta R_c - \Delta R_d - \Delta R_e - \Delta R_f) V/12R.$$

where:
v is the bridge output voltage;
V is the bridge supply voltage;
R is the nominal gauge resistance, and
$\Delta R_a$ through $\Delta R_f$ and $\Delta R_{a'}$ through $\Delta R_{f'}$ are the respective changes (from the initial balance condition) in resistance for the strain gauges.

As shown in FIG. 4, when a compressive pressure (referred to also as positive pressure) is applied to the sensor, the effect on a pair of strain gauges, i.e. a and a', places gauge a in compression and gauge a' in tension, thereby decreasing the resistance of gauge a and increasing the resistance of gauge a'. Inspection of equation (1) shows that both of these resistance changes would increase the output voltage, v, since $\Delta R_{a'}$ increases while $\Delta R_a$ decreases. Therefore, a compressive or positive pressure as shown in FIG. 4 results in an increased positive output voltage, v. In this manner, the gauge pair, a and a', is said to be wired into the bridge circuit of FIG. 5a in a positive sense. If the circuit positions of gauge a and gauge a' were reversed, the effect of a positive pressure on that gauge pair would decrease the output voltage; and it would then be said that the gauge pair was wired into the bridge circuit in a negative sense. In summary, all of the gauge pairs in FIG. 5a are wired in the positive sense since a compressive force will result in a larger positive output voltage, v.

The specific manner in which errors from direct thermal interference are eliminated by the circuit shown in FIG. 5a can also be seen from inspection of equation (1). If, for example, the temperature in the vicinity of gauge pair a and a' were changed uniformly, the resulting changes in the resistances of gauges a and a' would be essentially equal; and the net effect on the bride output voltage, v, would be zero. A similar condition would occur for each pair of gauges, i.e. b and b', c and c', etc., resulting in no change on the bridge output voltage, v.

Figure 6A:
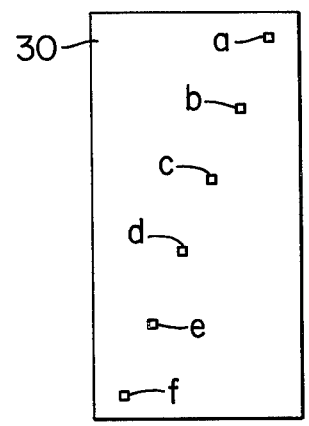
FIGS. 6a–c are various configurations for orienting the strain gauges on the thin interior member.

The location of each gauge a–f, a'–f' on network 38 is best described with reference to FIGS. 4 and 6a–6c. As noted above, gauges a–f are mounted within compression zones on member 30 while gauges a'–f' are mounted within tension zones. Instead of mounting the gauge pairs across the width of the member 30 as partially shown in FIG. 1, the gauge pairs may be staggered diagonally along the elevation of the member 30 as shown in FIG. 6a to measure an average pressure throughout the thickness of the ice formation. Gauges a–f in FIG. 6a have opposing gauges a'–f' (not shown) on the other side of member 30. In this manner, a direct reading from the terminals 46, 48 of network 38 provides an average pressure for the entire ice formation. The gauges a–f are staggered across the width of the member 30 in FIG. 6a to accommodate the wiring from each gauge which runs to the top end of the sensor between standoffs.

Figure 6B:
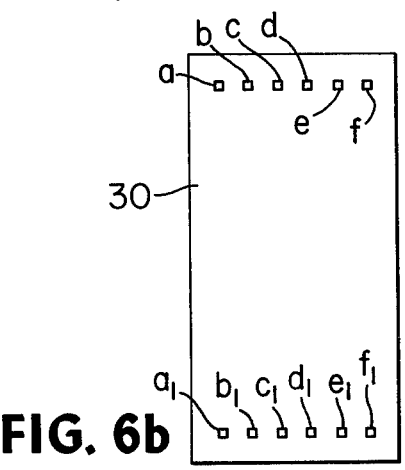

Alternatively, in FIG. 6b two complete sets of gauges a–f (having opposing gauges a'–f' not shown) and $a_1$–$f_1$ (having opposing gauges $a'_1$–$f'_1$ not shown) are mounted on two independent circuits as shown in FIG. 5a and are used to measure an average strain and, therefore, pressure at each end of member 30. This data can then be used to determine an internal amount occurring vertically within the ice formation. By comparing the difference between an average pressure force at the top of member 30 resulting from interpretation of the readout of the network having strain gauges a–f and a'–f' and an average pressure force at the bottom of member 30 resulting from the interpretation of the readout of the network having strain gauges $a_1$–$f_1$ and $a'_1$–$f'_1$, an internal moment occurring vertically within the ice formation is discernible. If the pressure at the top of member 30 is larger than the pressure at the bottom of member 30, the ice formation or ice plate is experiencing a positive bending moment tending to push the plate 13 downward as illustrated in FIG. 7. In a similar member, a transverse pressure variation within the ice formation can be measured by distributing the strain gauges across the width of the member 30 as shown in FIGS. 6a–b thereby measuring a pressure force variation across the width of the member 30.

Figure 5B:
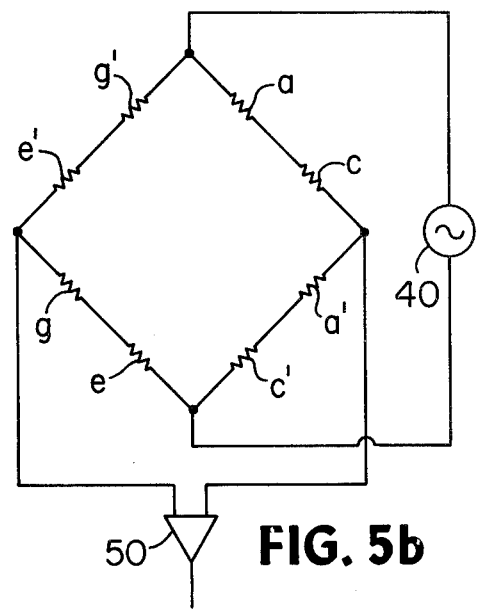

Output leads 52 (FIG. 1) for each gauge converge at the top end of the sensor 12 to form the network 38 (not shown in FIG. 1) immediately beneath the exit 53 of the housing 14. The input and output leads from the terminals 42, 44 and 46, 48, respectively (see FIGS. 5a–c), exit the housing 14 through a conduit 54 and terminate into a circuit board (not shown) outside the sensor.

Figure 5C:
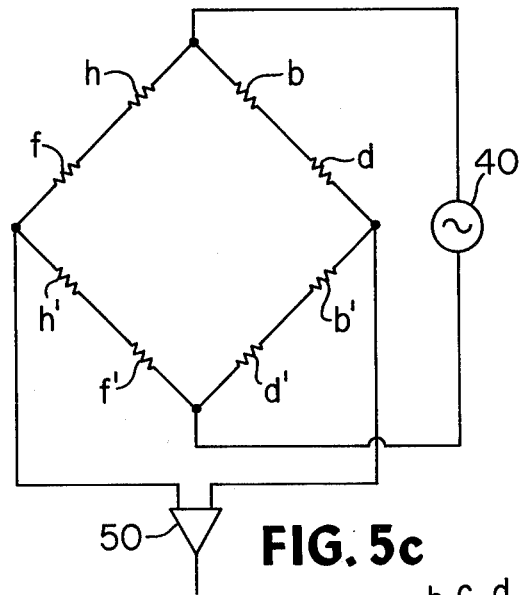
Figure 6C:
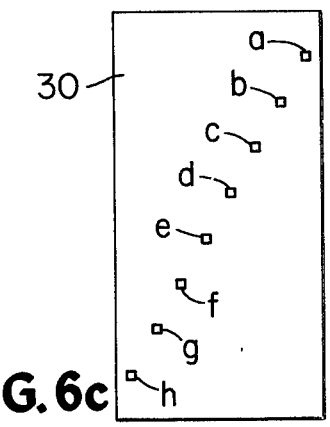

FIG. 6c illustrates a preferred orientation for a series of strain gauges a–h used to measure pressure and moment concurrently (in addition, gauges a'–h', not shown, are also attached to member 30 opposite gauges a–h). Gauges a, a', c, c', e, e', g and g' are connected in a wheatstone network similar to that shown in FIG. 5b and function similar to that described above with respect to FIGS. 5a and 6a. These gauges measure an average strain in the member 30 throughout the thickness of the ice plate and are, therefore, used to detect the pressure force. On the other hand, gauges b, b', d, d', f, f', h and h', detect the moment in the ice plate as illustrated diagramatically in FIG. 5c. Gauges b, b', d and d' are wired into the bridge circuit in a positive sense. In other words, as discussed above with respect to equation (1), changes in the resistance of these gauges would increase the output voltage, v, when a compressive or positive pressure is applied. Gauges f, f', h and h' are wired into the bridge circuit in a negative sense. Once again this terminology implies that a change in the resistance of gauges f, f', h and h' results in a decrease in the output voltage, v, of the bridge when a compressive or positive pressure is applied.

The bridge imbalance voltage for the moment circuit shown in FIG. 5c is given by the following general equation:

$$v = (\Delta R_f + \Delta R_h + \Delta R_{b'} + \Delta R_{d'} - \Delta R_b - \Delta R_d - \Delta R_{h'} - \Delta R_{f'}) V/8R \qquad (2)$$

Once again:
v is the bridge output voltage;
V is the bridge supply voltage;
R is the nominal gauge resistance; and
$\Delta R_b$, $\Delta R_{b'}$, $\Delta R_d$, $\Delta R_{d'}$, $\Delta R_f$, $\Delta R_{f'}$, $\Delta R_h$, $\Delta R_{h'}$ are the respective changes in resistance for the strain gauges from a balanced condition.

Since gauges b, d, f and h are mounted in compression zones, their resistance decreases with the application of a compressive or positive pressure force. In other words, the net change in resistance ($\Delta R$) of each compressive gauge decreases with a compressive pressure force. In addition, gauges b', d', f' and h' are mounted in tension zones. Their resistance increases with the application of a compressive or a positive pressure force. In other words, the net change in resistance ($\Delta R$) of each tension gauge increases with a compressive pressure force. Therefore, the output voltage, v, is positive, indicating a positive bending moment (see FIG. 7), when the sum of the changes in the resistance of gauges f, h, b' and d' ($\Delta R_f$, $\Delta R_h$, $\Delta R_{b'}$, $\Delta R_{d'}$) exceeds the sum of the changes in the resistance of gauges b, d, h' and f' ($\Delta R_b$, $\Delta R_d$, $\Delta R_{h'}$, $\Delta R_{f'}$). Since the pressure force in a positive bending attitude as shown in FIG. 7 is much larger at the top of the ice plate, the changes in resistance of gauges b, b', d, and d' located at the top of the member 30 are substantially larger than the changes in the resistance at the bottom of the member. Therefore, it is apparent that the values of $\Delta R_{b'}$ and $\Delta R_{d'}$ when combined in a negative manner, due to the minus sign, with a large change in resistance in the value of $\Delta R_b$ and $\Delta_d$ yields a large positive voltage, v, indicating a positive bending moment as shown in FIG. 7.

Referring to FIGS. 3 and 8, a series of sensors are combined by overlapping the lip protrusions 20 of each sensor 12. The slot 60 (FIG. 3) is incorporated within each lip protrusion 20 and runs the entire length of the sensor 12. When two sensors are combined, the stiffness of the composite connection 62 is approximately the same as the stiffness of the center region, c, of the sensor. Therefore, the pressure sensing area is uniformly stiff across the entire width, W', of all sensors permitting uniform load take-out from the ice formation. In this manner, an average strain is easily determinable. Several sensors or sets of sensors may be oriented in at least three directions (north-south, northwest-southeast, east-west). In this manner, the direction of maximum ice pressure force is easily discernible.

EXAMPLE

With reference to FIG. 9, a pressure sensing apparatus of the present invention having the following dimensions and properties was evaluated:
Material: 7000 Series Aluminum
$E = 10.4 \times 10^6$ psi
$\mu = 0.3$
$\sigma_{yield} = 72,000$ psi
$\omega = 0.125$ inch
$s = 0.8$ inch T = 0.437 inch
h = 0.0625
L = 78 inches
d = 0.09 ± 0.015 inch
W = 16.67 inches
l' = 0.4 inch
l'' = 0.275 inch
l'' − 2d = 0.095 ± 0.03 inch where:
E is the modulus of elasticity of the aluminum;
μ is Poisson's ratio;
$\sigma_{yield}$ is the yield stress of 7000 aluminum;
ω is the width of a standoff;
s is the center-line to center-line spacing between standoffs;
T is the thickness of the sensor;
h is the thickness of the thin, interior member;
L is the length of the pressure sensing area along an axis normal to the view of FIG. 9;
d is one-half the width of a strain gauge; and
W is the width of the sensor;

Theory

For purposes of this example, the standoffs 32 are assumed to be mutually parallel along axis 34 (FIG. 2).

The relationship of strain to pressure for the geometry of the present invention is defined by the general relationship:

$$\epsilon = \sigma/E \quad (1)$$

where $\epsilon$ is strain; $\sigma$ is stress; and E is the modulus of elasticity of the metal.

For the particular free-body diagram shown in FIG. 9a, which is the beam element used in the calculations to determine a relationship between stress and external pressure, p, maximum bending stress occurs at the edge of the standoff ($l_x = l''/2$). Using a static beam analysis approach, the stress of the particular free-body element can be expressed as:

$$\frac{\sigma_{max}}{p} = \frac{3(l')(l'')}{h^2} \quad (2)$$

where P as shown in FIG. 9a is the resolution of pressure according to the following:

$$P = pLl'$$

P is, therefore, the force on a element whose length (L) is along an axis normal to the view in FIG. 9.

Substituting equation (2) into equation (1) and solving for strain yields:

$$\epsilon = \frac{3(p)(l')(l'')}{Eh^2} \quad (3)$$

knowing $l_x = l''/2$, equation (3) reduces to:

$$\epsilon = \frac{6(p)(l')(l_x)}{Eh^2} \quad (4)$$

Due to the size and location of a strain gauge adjacent a standoff, the actual distance, $l_x$, is more accurately represented as:

$$l_x = l''/2 - d \quad (5)$$

Substituting equation (5) into equation (4), a relationship between the measured strain, $\epsilon_m$, for the geometry of the present invention and the external pressure force can be expressed as:

$$\frac{\epsilon_m}{p} = \frac{3(l')(l'' - 2d)}{E(h)^2} \quad (6)$$

Since one-half the width of the strain gauge (d) has a ±0.015 inch tolerance, solving for the $\epsilon_m/p$ relationship in equation (6) yields a value of $(2.81 \pm 0.89) \times 10^{-6}$/psi.

Testing

Figure 10:
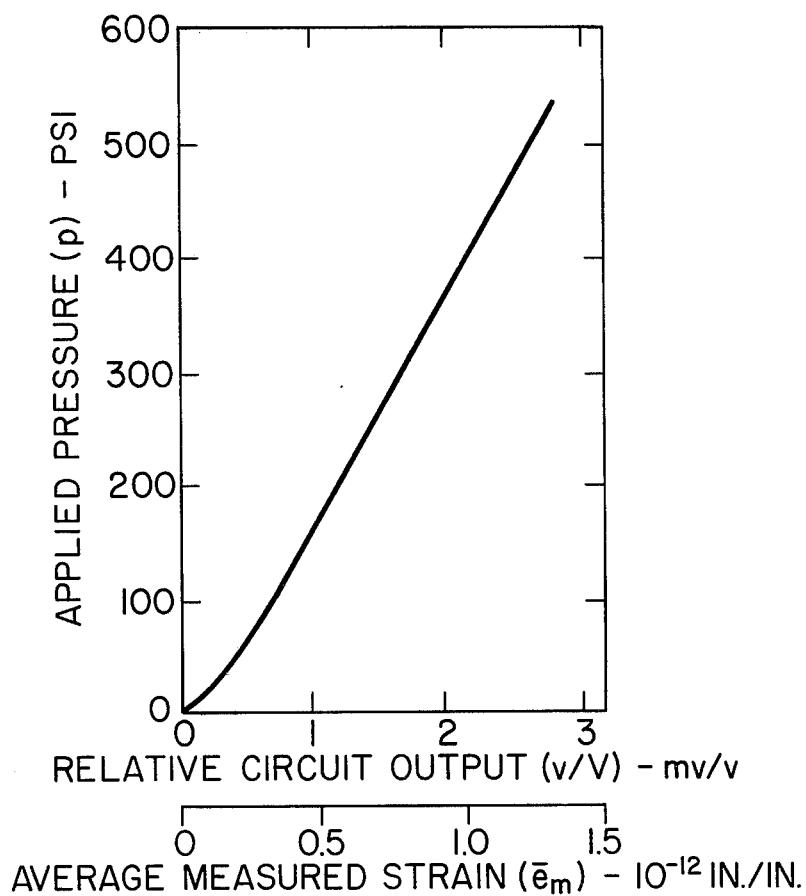
FIG. 10 is a graph of external pressure versus strain and volts of relative circuit output for the prototype discussed in the Example.

Laboratory tests of the sensor yielded a $\epsilon_m/p$ relationship of $2.28 \times 10^{-6}$/psi which was within the tolerance of the calculated value. A plot of pressure (psi) versus average measured strain, $\bar{\epsilon}_m$ (in/in), generates a curve as shown in FIG. 10. A second abscissa is shown on FIG. 10 which represents the relative circuit output, v/V, from the wheatstone network described above. The relationship between the relative circuit output, v/V (millivolts/volt), and measured strain $\bar{\epsilon}_m$ is represented as:

$$v/V = g\bar{\epsilon}_m$$

where g is a strain gauge factor peculiar to the specific strain gauges employed.

Effective Modulus Determination

The effective modulus of elasticity of the sensor, $E_s$, is a function of the beam and shear deflection for the free-body diagram illustrated in FIG. 9a. The relationship between load and deflection for a simple column is represented by the well known equation:

$$\Delta = \frac{PL_o}{AE_s} \quad (7)$$

where:
A = (l') (L);
$L_o$ = T, the thickness of the sensor;
P = pA = p (l') L; and
Δ = deflection Using static beam analysis, the deflection due to bending ($\Delta_B$) for the beam elements of the present invention is represented by the following:

$$\Delta_B = \frac{p(l')(l^3)}{Eh^3} \quad (8)$$

where:
l is the effective length of the deflecting beam element.

The shear deflection ($\Delta_s$) is represented as:

$$\Delta_s = \frac{2(p)(l')(l)(1 + \mu)}{(E)(h)} \quad (9)$$

Total deflection, Δ, is a combination of equations (8) and (9). Substituting the summation of equations (8) and (9) for deflection (Δ) in equation (7) and solving for the effective modulus of elasticity of sensor, $E_s$, yields:

$$E_s = \frac{(E)(T)(h^3)}{(l')(l^3)} \frac{1}{1 + 2(1 + \mu) h^2/l^2} \quad (10)$$

For purposes of this example where, in addition, l equals l', the calculated effective modulus of the sensor pursuant to equation (10) is 40,400 psi.

Figure 11:
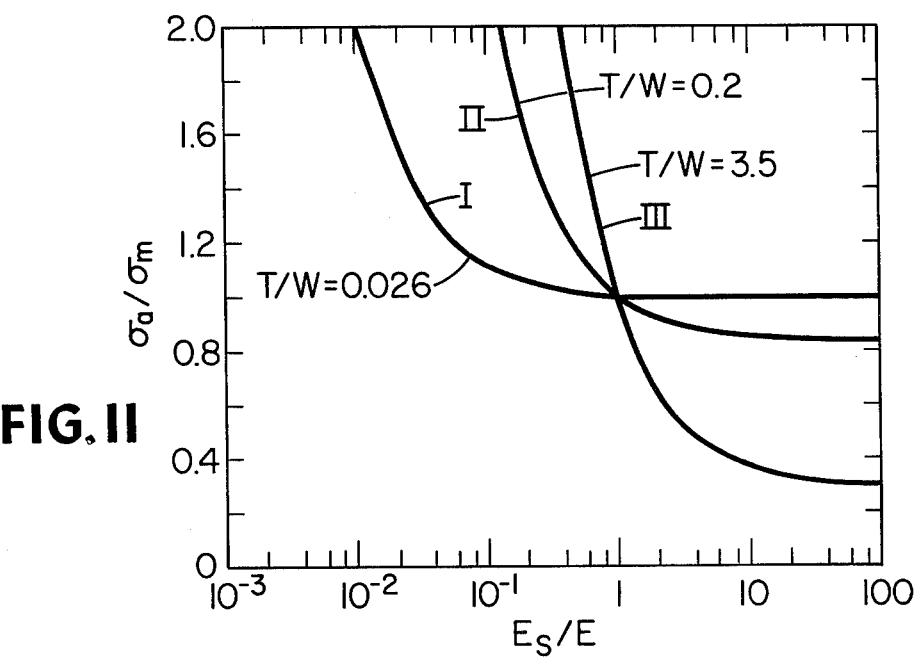
FIG. 11 is a graph of stress ratio versus modulus of elasticity ratio for the particular geometry of the sensor set out in the Example.

FIG. 11 is a graph of stress ratio ($\sigma_a/\sigma_m$) versus elastic modulus ratio ($E_s/E$). $\sigma_m$ is the measured stress within the embedding medium which, for purposes of FIG. 11, is ice. $\sigma_a$ is the actual ice stress. $E_s$ is the effective elastic modulus of the pressure sensing apparatus determined according to the theory discussed above while E is the elastic modulus of the embedding medium.

Curves I, II, and III illustrated in FIG. 11 represents various sensor thickness to width ratios (T/W). Each curve expresses stress ratio as a function of elastic modulus ratio for a particular geometry (T/W). The preferred geometry is a sensor which maintains a stress ratio of approximately one independent of variations in the elastic modulus ratio. In this manner, an accurate readout (i.e. staying near a stress ratio of one) is possible without undue interference from variations in the stiffness of the embedding medium. Differential thermal effects between the sensor and medium does not necessitate a sensor whose stiffness is substantially softer than the embedding medium (i.e. an order of magnitude less than the average anticipated ice stiffness—$E_s/E=0.10$). Actually, the magnitude of the error due to differential thermal expansion appears to be largely independent of sensor stiffness. The magnitude of the error is controlled rather by the geometry of the sensor. A design following the geometry of curve I is preferable since the error due to differential thermal expansion for thin, wide sensors (curve I) is minimal in comparison to thick, narrow sensors (curves II and III).

Ice creep has not been anticipiated to be a particularly significant problem for thin, wide sensors with an $E_s/E$ ratio around one. However, for a thick, narrow sensor (curves II and III) whose $E_s/E$ ratio is around one, creep would appear to appreciably affect the stress ratio since the modulus of elasticity of ice decreases with creep thereby increasing the $E_s/E$ ratio. From curves II and III it is apparent that a slight increase in the $E_s/E$ ratio will substantially vary the stress ratio due to the slope of the curve. The modulus of ice can vary rapidly sometimes even throughout the depth of the ice plate. While a variation in the modulus of the ice is not critical to the quality of the stress recorded, it is important to the magntidue of the data. If one knew where and by what amount the modulus of ice varied, the respective stress ratio factor could be applied. Unfortunately, such is frequently not kown. Therefore, thick and narrow sensors are usually designed very stiff ($E_s/E>10$) in an attempt to desensitize the sensor to variations in the modulus of ice. However, as noted above, thick and narrow sensors, due to their geometry, are particularly susceptible to differential thermal expansion error.

Curve I (FIG. 11) becomes asymptotic at an $E_s/E$ value of approximately one. By chosing various dimension and types of metal, an effective modulus for the sensor can be developed such that the $E_s/E$ range falls within a reasonable range about unity. In this manner, if an unknown variation in the modulus of elasticity of ice were to occur such that the $E_s/E$ ratio decreases from 1 to 0.1 only a 15% error (stress ratio=1.15) in the measured stress value would result. If the ice were to achieve its maximum expected elastic modulus (i.e. $10^6$ psi), then the stress ratio would be 1.31. On the other hand, if the ice were to exhibit a high degree of creep, then the effective ice modulus could be arbitrarily low, and the stress ratio could be as low as 0.98. Thus, the sensor defined in the Example could have a possible error of ±15% due to ice modulus variation assuming a nominal stress ratio of 1.15 as the working point.

While the dimensions of the sensor set out in the Example yields an effective modulus of approximately 40,000 psi, it appears preferable to have a sensor along the geometry of the present invention having an effective modulus of approximately 200,000–300,000 psi. In this manner, one can maintain an $E_s/E$ ratio near unity more often since typically the average anticipated stiffness or modulus of elasticity of sea ice exhibiting elastic properties is around 300,000±100,000 psi. The error resulting from the use of a sensor with an effective modulus of approximately 250,000 psi would be less than ±2½%. The dimensions on a sensor along the lines of the present invention having an effective modulus of approximately 250,000 psi would be identical to that noted above with respect to the Example except:

Material: 6000 series aluminum
$E = 10.6 \times 10^6$ psi
$\sigma_{yield} = 40,000$ psi
$\omega = 0.3125$ inch
$s = 1.0$ inch
$d = 0.03 \pm 0.005$
$l'' = l = 0.1875$, unlike the Example above, the standoffs are integral with the thin member as shown in FIG. 3a.
$l'' - 2d = 0.1275 \pm 0.01$
$E_s = 267,000$ psi The foregoing discussion of the invention has been described in terms of a particular embodiment. Various modifications and alterations will be apparent to those skilled in the art. It is, therefore, applicant's intention to cover all such equivalent modifications and variations that fall within the scope of this invention.

What we claim is:

1. A pressure sensing apparatus for measuring pressure forces in an embedding medium comprising:
   a housing whose thickness is substantially less than its width having first and second plates which are substantially parallel to one another and which are attached at their peripheral edges and are also responsive to external pressure forces;
   a thin, flexible member supported within said housing in spaced relationship between said first and second plates;
   a plurality of standoffs whose longitudinal axes are substantially parallel to one another and substantially parallel to one another and substantially normal to the direction of external pressure wherein said standoffs support said member in spaced relationship to permit reverse curvature bending of said member when said first and second plates are exposed to said external pressure defining tension and compression zones on the surfaces of said member such that the stiffness of the pressure sensing apparatus is substantially similar to the average anticipated stiffness of the embedding medium yet said apparatus is insensitive to variations in the stiffness of the embedding medium; and means for measuring the deformation of said member resulting from the reverse curvature bending due to said external pressure forces.

2. A pressure sensing apparatus for measuring pressure forces in an embedding medium wherein the stiffness of the pressure sensing apparatus is similar to the average anticipated stiffness of the embedding medium and the apparatus is insensitive to variations in the stiffness of the embedding medium, the apparatus comprising:
- a housing whose thickness is substantially less than its width having first and second plates which are substantially parallel to one another and which are attached at their peripheral edges and are responsive to external pressure forces;
- a thin, flexible member supported within said housing in spaced relationship between said first and second plates;
- a plurality of standoffs whose longitudinal axes are substantially parallel to one another and substantially normal to the direction of external pressure wherein said standoffs support said member in spaced relationship to permit reverse curvature bending of said member once said first and second plates are exposed to said external pressure defining tension and compression zones on the surface of said member; and
- a plurality of strain gauges attached to the tension and compression zones of said member to measure the strain in said member.

3. A pressure sensing apparatus for measuring pressure forces comprising:
- a housing whose thickness is substantially less than its width having a first and second plate substantially flat and substantially parallel wherein said plates are attached at their peripheral edges and are responsive to externally applied pressure forces;
- a thin, flexible member, supported within said housing in spaced relationship between said first and second plates;
- a plurality of elongated standoffs having mutually parallel longitudinal axes normal to the direction of external pressure wherein said standoffs are staggered at predetermined intervals on both sides of said member between said member and said first and second plates to support said member in spaced relationship between said first and second plates to permit reverse curvature bending of said member when external pressure is applied against said first and second plates defining tension and compression zones on the surfaces of said member; and
- a plurality of electrical resistance strain gauges attached to the tension and compression zones of said member to measure strain in said member.

4. The apparatus according to claim 3 wherein said standoffs are mounted to said member and contact said first and second plates.

5. The apparatus according to claim 3 wherein such standoffs are mounted to said first and second plates and contact said member.

6. The apparatus according to claim 3, wherein said apparatus further comprises means for combining one pressure sensing apparatus with an adjacent pressure sensing apparatus to provide a larger pressure sensing area such that the stiffness at the connection between the two pressure sensing apparatuses is similar to the stiffness at the center region of a pressure sensing apparatus.

7. The apparatus according to claim 6 wherein said combining means includes a lip protrusion on at least two outer edges of said housing formed by the relatively staggered placement of said first plate with respect to said second plate.

8. The apparatus according to claim 3 wherein said strain gauges are attached in pairs to said member, one of each pair on each side of said member between opposing pairs of standoffs, to compensate for thermal interference.

9. The apparatus according to claim 8 wherein said strain gauges attached to said member are arranged in a diagonal pattern along the length and width of said member to monitor external pressure force as a function of depth through the embedding medium.

10. The apparatus according to claim 9 wherein said strain gauges attached to said member are arranged in a diagonal pattern along the length and width of said member to further monitor the bending moment within the embedding medium.

11. The apparatus according to claim 8 wherein said strain gauges attached to said member are arranged into at least two independent sets of gauges horizontally spaced across the width of said member to permit the determination of an average pressure force for each set of gauges and to monitor bending moment within the embedding medium.

12. A pressure sensing apparatus for measuring pressure forces in an embedding medium wherein the stiffness of the pressure sensing apparatus is similar to the average anticipated stiffness of the embedding medium, the apparatus comprising:
- a housing having a first and second plate substantially flat and substantially parallel to one another, such plates being sealably connected at their peripheral edges and responsive to external pressures;
- a thin member supported within said housing and in spaced relationship between said first and second plates;
- a plurality of standoffs having substantially parallel longitudinal axes staggered at predetermined intervals normal to the direction of external pressure on both sides of said member to displace said member in spaced relationship with said first and second plates to permit reverse curvature bending of said member defining tension and compression zones on the surfaces of said member between said predetermined intervals when said housing is subjected to external pressures; and
- a plurality of strain gauges attached to the compression and tension zones of said member to measure the strain of said member due to the reverse curvature bending resulting from external pressure applied against said first and second plates.

13. In a pressure sensing apparatus for measuring pressure forces in an embedding medium having a housing which includes a first and second plates substantially flat and mutually parallel and attached at their peripheral edges, and a thin member supported in spaced relationship between the first and second plates, the improvement which comprises:
- a plurality of standoffs whose longitudinal axes are substantially parallel to one another and substantially normal to the direction of external pressure supporting said member in spaced relationship to permit reverse curvature bending of said member when said first and second plates are exposed to said external pressure defining tension and compression zones on the surface of said member when said pressure is applied to said first and second plates such that the stiffness of the pressure sensing apparatus is substantially similar to the average anticipated stiffness of the embedding medium; and means for measuring the deformation of said member resulting from the reverse curvature bending due to the said pressure.

14. The improved apparatus according to claim 13 wherein said measuring means comprises a plurality of electrical resistance strain gauges attached to the tension and compression zones of said member.

15. The improved apparatus according to claim 14 wherein the improvement further comprises means for combining one pressure sensing apparatus with an adjacent pressure sensing apparatus to provide a larger pressure sensing area such that the stiffness at the connection between adjcent pressure sensing apparatuses is similar to the stiffness at the center region of the pressure sensing apparatus.

* * * * *

UNITED STATES PATENT OFFICE
CERTIFICATE OF CORRECTION

PATENT NO. : 4,175,445
DATED : November 27, 1979
INVENTOR(S) : John S. Templeton, III It is certified that error appears in the above–identified patent and that said Letters Patent are hereby corrected as shown below:

Column 1, line 41, delete "park" and insert therefor --pack--.

Column 3, line 53, delete "cross-section" and insert therefor --cross-sectional--.

Column 5, line 49, delete "4'" and insert therefor --f'--.

Column 7, line 22, delete "amount" and insert therefor --moment--.

Claim 1, column 12, line 56, after the word "and", delete "substantially parallel to one another and".

Signed and Sealed this

Eighteenth Day of March 1980

[SEAL]

Attest:

Attesting Officer

SIDNEY A. DIAMOND

Commissioner of Patents and Trademarks